United States Patent [19]

Wheatley

[11] Patent Number: 4,735,818

[45] Date of Patent: Apr. 5, 1988

[54] POTATO SKIN PRODUCT AND POTATO PREPARATIONS PRODUCED THEREFROM

[76] Inventor: Charles E. Wheatley, 1220 Ramblinghills Dr., Cincinnati, Ohio 45230

[21] Appl. No.: 897,346

[22] Filed: Aug. 18, 1986

[51] Int. Cl.⁴ ............................................. A23L 1/216
[52] U.S. Cl. .................................... 426/637; 426/512; 426/520; 426/524
[58] Field of Search ............... 426/637, 438, 302, 305, 426/512, 138, 390, 391, 282, 520, 589, 524

[56] References Cited

U.S. PATENT DOCUMENTS

| | | | |
|---|---|---|---|
| 2,968,561 | 1/1961 | Birnkrant | 426/391 |
| 3,057,732 | 10/1962 | Conrad et al. | |
| 3,519,432 | 7/1970 | Succo et al. | 426/517 |
| 3,764,344 | 11/1973 | Glabe et al. | |
| 3,800,054 | 3/1974 | Giesfeldt | 426/138 |
| 4,167,588 | 9/1979 | Willard | |
| 4,280,402 | 7/1981 | Featherstone | 426/517 |
| 4,298,627 | 11/1981 | Rains | 426/637 |
| 4,420,494 | 12/1983 | Glantz | |
| 4,520,034 | 5/1985 | Ishii et al. | |

*Primary Examiner*—R. B. Penland
*Attorney, Agent, or Firm*—Wood, Herron & Evans

[57] ABSTRACT

A potato skin product is prepared by comminuting raw potato skins into a thick runny soup, including an edible binder in the soup and cooking the resultant soup mixture to form a thin flexible cooked potato skin product. The raw potato skin soup may be sprayed onto a cooking surface in the form of a thin layer and baked to form a product. The thin product produced maintains its flexibility even upon freezing and the frozen product may be reformed into the cavities of containers. The potato skin product serves as a shell for cooked potato interiors and other fixings.

18 Claims, No Drawings

POTATO SKIN PRODUCT AND POTATO PREPARATIONS PRODUCED THEREFROM

BACKGROUND OF THE INVENTION

The potato is a widely cultivated vegetable and a very popular foodstuff. Baked potatoes, potato chips, and other variations of potato products are staple products that are widely enjoyed. Many efforts have been directed to the preparation of potato products and typical examples of patents directed to potato foodstuffs and methods of preparation include U.S. Pat. Nos. 3,057,732; 3,764,344; 4,167,588; 4,420,494 and 4,520,034. It has been a primary objective of persons working in the art of potato foodstuffs, and methods of improving same, to utilize the entire potato including the skin. Even most recently, in fast food operations, bars and restaurants, baked potato skins have become a popular snack. A number of problems currently exist with the potato skin product. First, the preparation of a baked potato skin is rather time consuming since it involves baking the potato, slicing the potato in half and then removing the interior starchy portion of the potato. These operations are usually conducted by hand. Thereafter, the baked potato skin, if not promptly eaten, tends to absorb moisture, become soft and rather unsightly, thereby losing its appeal and flavor. Sometimes, such potato skins are continually reheated thereby becoming hardened, burned or rather tasteless.

Various attempts have been made as exemplified by the above patents to produce new potato products. For instance, U.S. Pat. No. 4,167,588 issued to Willard discloses a baked potato product which is obtained by first baking the potato with its skin to provide the baked potato and subsequently separating the baked potato skins to form a baked potato peel fraction. The baked potato peel fraction is then formed into a slurry with binding agents including egg solids or other ingredients to form an essentially potato-based dough. The potato-based dough is then formed into an outer layer around the core of cooked potato mash to form an intermediate potato product which then may be again cooked. Efforts of preparing such twice-baked potato products inherently involve multiple steps and difficulties in separating a baked potato skin from the baked potato, then grinding and preparing the baked skin with other components to provide an intermediate product. Also, such a product becomes cooked twice, thereby tending to lose some of its natural flavor components. Other patents are directed to dough compositions including potato components. For instance, with reference to U.S. Pat. No. 3,764,344 to Glabe et al, a dough composition for a baked cup-shaped shell is disclosed in which durum wheat semolina is combined with glycerin, starch, and a potato peel flour along with other ingredients to make a shell. To the baked simulated potato shell is added mashed potatoes and the resulting product is baked again. Again, this is another example of a twice-baked potato product utilizing various components of the potato.

Improvements are still needed in this area of the art in order to more satisfactorily utilize the natural potato including its skin portion. There is a special need to prepare a potato skin product which is of consistent quality and very attractive for consumption. There is also a need for a method of processing potato products and all of its components in order to prepare attractive products which can be refrigerated and even frozen without loss of stability or flavor.

SUMMARY OF THE INVENTION

This invention is directed to a new potato skin product and potato preparations produced therefrom. The invention is particularly directed to a novel method for making a potato skin product of consistent quality that is especially adapted for fast food operations. It has been found that potato skin products may be processed with uniformity from normal skin waste of potatoes and such potato skin products can be refrigerated or even frozen as a fully cooked item for extended periods without loss of flavor or essential properties.

According to this invention, the raw skin of a potato which is normally wasted may be processed into a slurry in a blender or a food processor. The skins are processed until they provide a texture of a thick runny soup. Depending upon the efficiency with which the skin is removed from the potato core, a certain amount of the potato core may be processed with the skin. Upon the obtainment of the thick raw potato skin soup, a binder is added and blended therewith. For instance, a preferred binder additive is an egg or flour, or mixtures of both. The product may be optionally seasoned with spices, salt and/or sugar. After the potato skin soup with binder has been prepared, the mixture is sprayed or coated onto a baking pan such as a teflon baking pan. The sprayed or coated potato skin soup mixture is provided in thicknesses on the order of about $\frac{1}{8}$ inch in order to produce a thin finished potato skin product. One method of finishing or cooking the product is by baking usually at about 350° F. for about 30 minutes and, thereafter, the cooked skins may be removed for direct consumption, or storage by refrigeration and freezing. The baked potato skins may also be formed into potato shells of various shapes inside a holder or container, and the potato core which was removed from the potato skin, and separately cooked, may then be introduced into the baked potato skin product. For example, the formed skin product may be placed into a plastic holder and whole, quartered or mashed potatoes may be introduced there into to produce a novel baked potato skin like product of exceptional taste.

In contrast to the techniques that have heretofore been proposed, the method of this invention offers a simple method for utilizing raw potato skins which otherwise have usually been wasted. Furthermore, unlike the cumbersome methods of previously baking potatoes followed by removal of the potato interiors, and multiple baking techniques associated therewith, this invention offers a simple method to prepare a potato skin product of consistent quality without loss of potato skin flavor.

In a preferred form of the invention, the potato skin product is made and cooked such that a flexible thin flat product or shell is provided for later handling. It has been found that the potato skin product fabricated with the binders according to this invention may even be placed in a freezer in a flat or shaped and thin leather-like form without loss of its desirable flexibility for later handling. Thus, advantageously the potato skin product may be made, stacked, frozen and thereafter immediately be employed in a food operation without thawing because its flexibility and handling have not been lost in such a frozen state. It has also been found that potato skin products of this invention may be removed from a freezer in a thin flat form and introduced into a serving cavity or dish. Upon exposing the flat frozen flexible potato skin product to warm air, for instance from a hair dryer, it will conform to the cavity into which it is placed for use as a receptacle for mashed or whole potato interior along with other potato fixings. Such versatility in the potato skin products of this invention is unmatched by potato products currently available in the trade.

Other embodiments of this invention along with variations thereof will be further understood with reference to the following detailed description.

DETAILED DESCRIPTION

A quantity of potatoes are peeled either by hand or preferably by potato peeling machines to provide a quantity of potato skins. Idaho and russet, brown-skinned white potatoes are considered to be preferred for use in accordance with the principles of this invention. A quantity of such potato skins are then placed in a blender or food processor and processed until they are the texture of a thick runny soup. Since some of the potato starch adhering to the skin tends to be a part of the skin soup, a coloring agent is normally used to darken any light colored cast of the potato starch. For instance, gravy mixes such as Kitchen Bouquet or Gravy Master may be added to darken this soup to enhance the color of the resultant product, depending upon the desired color. A binder or several binders are then introduced into the potato skin soup. Preferably, an egg binder is employed, usually on the basis of one large egg per cup of skin soup. Flour is also preferably employed on the order of about 2 tablespoons of Bisquick per cup of soup. Optionally, salt and other flavorings such as one tablespoon of sugar may also be added for blending together with the potato skin soup. Increasing the quantity of the binder increases the viscosity of the soup to produce the prepared potato skin product according to the principles of this invention. Generally, spraying the soup onto a hot surface directly for baking would reduce the amount of binders needed to keep the mixture from spreading too thinly. The potato skin preparation after coating in a pan is then ready for baking. In one form of the invention, a teflon baking pan such as a cupcake tin perhaps having the configuration of a small to medium baked potato, even with embossed potato eyes and creases, may be provided. The potato skin soup mixture is then sprayed into the baking pan cavities. The objective is to coat the interior of the baking pan cavities with a relatively thin mixture of the skin soup to provide a thin product in flat or shelllike form. Alternatively, a hot baking pan may be sprayed or coated with the thick runny soup and then the excess run off of the baking pan surface to provide a thin coating of the preparation for further baking. Baking is accomplished until the potato skin product lifts out, usually on the order of about 350° F. for about 30 minutes, whereupon it may be stacked in the form produced. The product is produced simply in flexible flat or thin pancake-like form so that it may be easily stacked for storage or refrigeration. As indicated above, the cooked flexible product does not lose its flexibility upon freezing and this property is advantageously used to handle it upon further use.

The potato skin soup can also be fried or cooked similar to pancakes or crepes and molded later to resemble potato skins. Flat fried skins can be scraped while frying for thinness and then press cut by cookie cutter, for instance, to facilitate forming into potato-shapes inside plastic holders or containers. The potato skin flat product can also be shaped as a pocket so as to market it as the familiar pita bread pocket. Alternatively, cast iron cavities preheated to about 450° F. can be sprayed and placed in a 350° F. oven for about 5 minutes before lifting the shells out, whereupon the shells may be replaced in the cavities and baked for another 25 minutes at 350° F. Lifting such shells out early and replacement prevents sticking where such cast iron cavities are employed. Cast iron cavities tend to work well because they hold the heat and the potato skin mixture upon spraying does not cool the heated surfaces off during the initial binding part of the baking process. The potato skin soup can also be poured into hot cast iron cavities, held for 10-15 seconds, then the excess poured out to achieve enough binding action to hold the uncooked shell in place. Thereafter, it is then returned to the oven for completion of the cooking.

After preparation of the cooked potato skin products or shell according to the above techniques, it may be filled with previously cooked or mashed potatoes and served. The potato skin shell may also be used with other condiments such as sour cream, chives, cheddar cheese, other vegetables, chili and cheese, bacon bits and so forth as are commonly employed. A preferred method of serving the potato skin shells with potatoes is to boil the peeled potatoes and keep them in a warm state. The warm potatoes may be placed in a hot crock with a squeegee inside and a hole at the crock bottom. The crock may be heated and a tube would lead from the crock hole for squeegeeing an amount of the potatoes from the crock through the tube into the baked potato skin shell. The form of the potato in the crock may be varied, depending upon the desired end product. For instance, the potato may be quartered, partially quartered or diced in the crock. In addition, as the potato is removed from the crock it may be passed through a screen which will particulate the potato as it is passed or forced through the hole. Thus, to make a potato product, the skin may be placed in a suitable container or plastic holder. Then, the squeegeed crock is employed to force whole or quartered potatoes from the crock into potato skins with the texture desired. As indicated above, if the potato skin has been previously frozen or is not warm, a simple hair dryer or air blower can be used to blow on it after it has been placed into the holder to form the potato shell in the holder. In addition to warming the shell, it will help mold the shell into shape desired. The holder or container for the shell and potato product may have aluminum wrapping of sheet material which can be folded over to maintain the warmth of the prepared product. As indicated above, the potato product may be garnished with a number of fixings such as butter, sour cream, chives, and other products. In addition, in the fabrication of the potato skin product, other additives such as iron, vitamins, minerals, other vegetables such as broccoli, carrots, etc., can be added to the potato skin shells, as well as other flavoring agents, coloring and eye-appeal enhancements.

The following specific examples will illustrate various features of the invention.

EXAMPLE I

A quantity of potato skins were obtained by peeling raw potatoes. The potato skins were placed in a conventional blender and blended to provide a soup having a thick runny texture. To the raw potato skin soup was added, on the basis of one cup of soup, one large egg and two tablespoons of Bisquick as binders. One tablespoon of sugar was also added. The resulting potato skin mixture was sprayed or coated to obtain a thickness of about ⅛ inch into cast iron cavities which were preheated to about 450° F. Thereafter, the preheated cast iron cavities were placed in an oven and heating continued at 350° F. for 5 minutes whereupon the shells that were formed were lifted out of the cavities. The shells were then replaced in the cavities and baking continued for 25 minutes. The lifting and replacement of the shells prevented sticking. It has been found that such cast iron cavities work well because they hold the heat and the sprayed or coated potato skin mixture does not cool them off during the initial binding part of the baking process. The resulting finished or cooked potato skin shells were then suitable for use with potato stuffing such as mashed, quartered, diced, or similar potatoes with the usual fixings.

EXAMPLE II

The raw potato skin mixture containing the binders as prepared in Example I was spray coated onto a teflon coated cooking pan surface in flat or pancake-like fashion. The raw potato skin mixture was baked for about 30 minutes at about 350° F. to provide a flexible leather-like flat product upon cooling. The flat potato skin products were stacked in this form, placed in a freezer. It was noted during the passage of time that flexibility of the product was maintained and it was storage stable. The product was then removed from the freezer after days of storage in its flexible state and placed into a formed or shaped container. Upon treatment of the flat product with a hot air dryer very briefly, it conformed to the shape of the container. In such form it could be used as a shell for receipt of potatoes or other condiments in the fashion of Example I.

EXAMPLE III

Example I was repeated except that broccoli or other vegetables are added to the raw potato skin mix. Upon processing in a similar fashion, the finished or baked potato skin product had a delightful vegetable flavor as enhanced by the broccoli or other vegetable.

EXAMPLE IV

Example I procedures were repeated except instead of baking the raw potato skin mixture, the mixture was fried to provide a different taste. Fried potato-like skins or baked-like skins prepared according to this and the foregoing Examples can be rolled into a jelly roll and dipped into condiments or otherwise enhanced to provide serving variations.

In view of the above detailed description it will be appreciated that this invention facilitates the production of a potato skin product and potato preparations having consistent quality of both potato and skin. In addition, the invention offers a fast food capability where both the potato and the skin may be consumed. Potato skin shells can be centrally processed and made very attractive and hot at the point of sale. The technique of this invention employs raw skins which are otherwise wasted, thereby providing an economic advantage. Moreover, additives such as vitamins, minerals, other vegetables, flavoring agents and the like may be added to the potato skin soup to be fabricated into the potato skin shells, thereby offering versatility. The potato skin product may be used in and of itself for hors d'oeuvres in combination with hot cheeses, egg salads, chili, dip mixtures, or simply mashed potatoes. Somewhat thicker shells may be of waffle texture and formed like an ice cream cone for making a potato cone perhaps with a hot cheese, chili, sour cream or other topping. Even fried potato skins with enhanced-flavor mashed potatoes can be rolled as a jelly roll and dipped into various condiments. Again, along with many of the advantages just mentioned, the shells can be refrigerated and even frozen for an indefinite period of time without noticeable change and without loss of flexibility for ease of handling and use in making a final potato product.

Other variations or modifications of this invention will become apparent to a person of ordinary skill in this art in view of the above description and detailed operating procedures.

What is claimed is:

1. A method of making a potato skin product which comprises
    providing raw skins of a previously peeled potato,
    comminuting in a conventional blender said raw skins into a thick runny soup of raw ingredients,
    including an edible binder in the raw ingredients of said soup, said binder contained in an effective amount to increase the viscosity of said soup, forming a thin layer from the resulting soup mixture, and
    cooking the thin layer until a thin flexible cooked potato skin product is produced.

2. The method of claim 1 wherein said resulting soup mixture is cooked by first spraying onto a cooking surface or cavity in the form of a thin layer and then subjecting the sprayed layer to heat.

3. The method of claim 1 wherein said resulting soup mixture is cooked by frying.

4. The method of claim 1 wherein the product produced is a thin flexible shell suitable for frozen storage without loss of flexibility.

5. The method of claim 1 wherein said binder is selected from the group consisting of egg, flour and mixtures thereof.

6. The method of claim 5 wherein said mixture contains another edible condiment selected from the group consisting of vitamins, minerals, vegetables, flavoring agents, coloring agents, and mixtures thereof.

7. The method of claim 1 further including the step of introducing a cooked potato interior into the potato skin product.

8. The method of introducing the flexible product produced by the method of claim 1 into a container and forming the product to the general shape of the container.

9. The method of claim 8 wherein the potato product is shaped to the container by warming with hot air.

10. The method of claim 8 wherein the potato product, prior to forming, is frozen.

11. The product produced by the method of claim 1.

12. The product produced by the method of claim 2.

13. The product produced by the method of claim 3.

14. A method of making a potato skin product which comprises
    providing raw skins of a previously peeled potato,
    comminuting in a conventional blender said raw skins into a thick runny soup of raw ingredients,
    including an edible binder in the raw ingredients of said soup, said binder contained in an effective amount to increase the viscosity of said soup, spray coating the resulting soup mixture in the form of a thin layer onto a surface for baking, and heating said thin layer until a thin flexible baked potato skin product is produced.

15. The method of claim 14 wherein the product produced is placed in frozen storage without loss of flexibility.

16. The method of claim 15 wherein said binder is selected from the group consisting of egg, flour and mixtures thereof.

17. The method of claim 15 further comprising removing the product from frozen storage for direct placement into a container and forming a shell therefrom to the general shape of the container.

18. The method of claim 17 wherein the potato skin shell is shaped to the container by warming with hot air.

* * * * *